US012505743B2

United States Patent
Zhao et al.

(10) Patent No.: US 12,505,743 B2
(45) Date of Patent: Dec. 23, 2025

(54) METHOD FOR GLOBAL PARKING STATUS DETECTION BASED ON 4D MILLIMETER WAVE IMAGING RADAR

(71) Applicant: Shanghai Geometrical Perception and Learning Co., Ltd., Shanghai (CN)

(72) Inventors: Yingzhong Zhao, Shanghai (CN); Xinfei Lu, Shanghai (CN); Dan Xue, Shanghai (CN); Songhua Shi, Shanghai (CN)

(73) Assignee: Shanghai Geometrical Perception and Learning Co., Ltd., Shanghai (CN)

( * ) Notice: Subject to any disclaimer, the term of this patent is extended or adjusted under 35 U.S.C. 154(b) by 0 days.

(21) Appl. No.: 18/872,478

(22) PCT Filed: May 17, 2024

(86) PCT No.: PCT/CN2024/093851
§ 371 (c)(1),
(2) Date: Dec. 6, 2024

(87) PCT Pub. No.: WO2025/152312
PCT Pub. Date: Jul. 24, 2025

(65) Prior Publication Data
US 2025/0265928 A1  Aug. 21, 2025

(30) Foreign Application Priority Data
Jan. 18, 2024  (CN) .......... 202410075903.X

(51) Int. Cl.
G08G 1/14  (2006.01)
G01S 7/41  (2006.01)
(Continued)

(52) U.S. Cl.
CPC .......... *G08G 1/141* (2013.01); *G01S 7/411* (2013.01); *G01S 13/89* (2013.01); *G01S 13/91* (2013.01)

(58) Field of Classification Search
CPC .............. G01S 13/931; G01S 13/89; G01S 2013/9314; G01S 17/931;
(Continued)

(56) References Cited

U.S. PATENT DOCUMENTS

2017/0017848 A1\* 1/2017 Gupta ............... B60W 30/06
2017/0294121 A1\* 10/2017 Jain .................. G01S 13/931
(Continued)

FOREIGN PATENT DOCUMENTS

CN   106097755 A   11/2016
CN   111710040 A    9/2020
(Continued)

OTHER PUBLICATIONS

ZhaoXiang; YangMing; WangCunXiang; WangBing,"Lane-level location method based on vision and millimeter wave radar", «Journal of Shanghai Jiaotong University», Jan. 28, 2018, pp. 33-38.
(Continued)

*Primary Examiner* — Olumide Ajibade Akonai
(74) *Attorney, Agent, or Firm* — MUNCY, GEISSLER, OLDS & LOWE, P.C.

(57) ABSTRACT

A method for global parking status detection based on 4D millimeter wave imaging radar, includes: self-vehicle position estimation based on the relative transformation between the acquired front and rear frames of the 4D millimeter wave imaging radar point cloud; acquire a submap within a preset range around the self-vehicle; carry out the extraction of the ROI point cloud in the generated submap; carry out filtering, clustering, and point cloud contour extraction processing points sequentially on the extracted point cloud; and carry
(Continued)

out the fitting process of the vehicle position boundary points based on the acquired individual boundary points; associate the currently detected parking space boundary points with the global parking space point cloud map for the parking space, and obtain the submap point cloud parking space and global parking space association pairs; and make judgement of the parking space state based on the parking space association state.

14 Claims, 1 Drawing Sheet

(51) Int. Cl.
  *G01S 13/89* (2006.01)
  *G01S 13/91* (2006.01)
(58) Field of Classification Search
  CPC ......... G01S 2013/93271; G01S 13/865; G01S 13/87; G01S 13/86; G01S 2013/93275; G01S 13/88; G01S 7/418; B60W 30/06; B60W 2420/408; B60W 40/00; B60W 60/001; B60W 2552/53; G06V 20/586; G06V 20/58; G06V 20/56; G06V 10/44; G06V 10/25; G06V 10/806; G06V 20/64; B62D 15/0285; B62D 15/027; G08G 1/148; G08G 1/14; G08G 1/143; G08G 1/0969; G08G 1/146; G08G 1/141; G08G 1/147; G08G 1/144; G08G 1/142; G08G 1/0125; G08G 1/0137; G06T 2207/20104; G06T 2207/10028; G06T 2207/10044
  See application file for complete search history.

(56) References Cited

U.S. PATENT DOCUMENTS

| | | | |
|---|---|---|---|
| 2020/0258385 A1 | 8/2020 | Mahajan | |
| 2022/0024449 A1* | 1/2022 | Hayakawa | ......... G07C 9/00309 |
| 2022/0155432 A1 | 5/2022 | Du et al. | |
| 2022/0178718 A1 | 6/2022 | Xia et al. | |
| 2024/0017719 A1* | 1/2024 | Gong | .................... B60W 30/06 |
| 2024/0027604 A1* | 1/2024 | Lyu | ........................... G01S 7/40 |
| 2024/0051520 A1* | 2/2024 | Kim | ...................... G01S 13/931 |
| 2025/0095345 A1* | 3/2025 | Gupta | ....................... G06T 7/11 |

FOREIGN PATENT DOCUMENTS

| | | | | |
|---|---|---|---|---|
| CN | 112967516 A | | 6/2021 | |
| CN | 113192337 A | * | 7/2021 | ........... G08G 1/0125 |
| CN | 113819914 A | | 12/2021 | |
| CN | 114488026 A | | 5/2022 | |
| CN | 114706070 A | | 7/2022 | |
| CN | 115273028 A | | 11/2022 | |
| CN | 115423972 A | | 12/2022 | |
| CN | 115685185 A | | 2/2023 | |
| CN | 116359873 A | | 6/2023 | |
| CN | 116359905 A | | 6/2023 | |
| CN | 2023207845 A1 | | 11/2023 | |
| CN | 117213465 A | * | 12/2023 | |
| CN | 117590371 A | | 2/2024 | |
| DE | 102018104243 B3 | | 5/2019 | |
| WO | 2022007776 A1 | | 1/2022 | |
| WO | 2022138123 A1 | | 6/2022 | |
| WO | 2023129856 A1 | | 7/2023 | |

OTHER PUBLICATIONS

ZhangChenTao; QinLiRen; YangHang; ZhaoZheDong; TanZeDan"Review on research progress of key technologies of automatic parking", «Journal of Automotive Engineering,», Sep. 30, 2023, pp. 603-614.

Philip A K, Sackey M, Owusu-Ansah P, et al,2015 IEEE 18th International Conference on Intelligent Transportation Systems, On-Street Parking Statistics Using Lidar Mobile Mapping, Dec. 31, 2015,pp. 2812-2818.

* cited by examiner

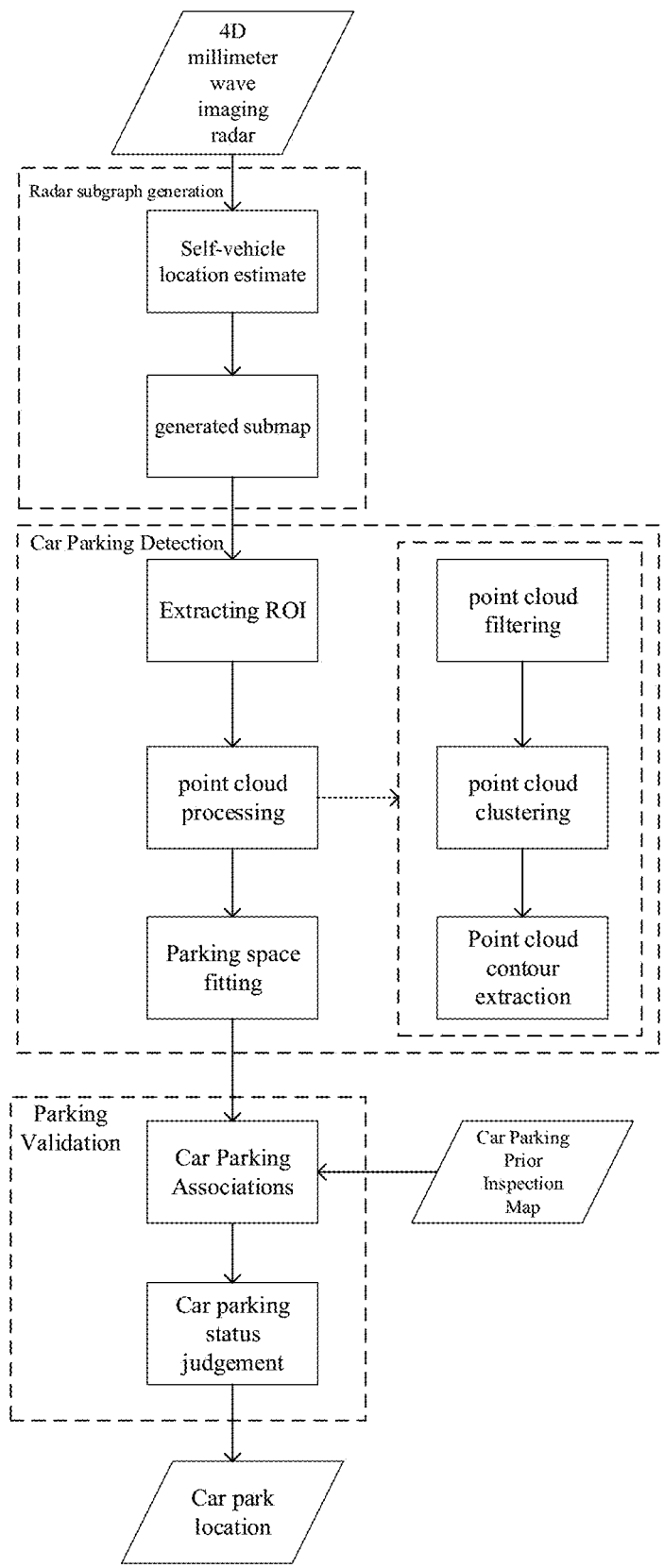

METHOD FOR GLOBAL PARKING STATUS DETECTION BASED ON 4D MILLIMETER WAVE IMAGING RADAR

CROSS-REFERENCE TO RELATED APPLICATION

This application claims priority of Chinese Invention patent application No. 202410075903.X filed Jan. 18, 2024, which is incorporated herein by reference.

FIELD OF TECHNOLOGY

The present invention relates to the technical field of 4D millimeter wave imaging radar, in particular to the technical field of automatic drive, specifically, it refers to a method, device, processor, and computer-readable storage medium of global parking status detection based on 4D millimeter wave imaging radar.

DESCRIPTION OF RELATED ARTS

Parking space detection is a crucial step in self-driving AVP autonomous valet parking applications. Currently, parking space detection generally uses visual and non-visual sensors. Visual detection methods mainly use monocular cameras, binocular cameras and RGDB cameras to extract the corner features of parking spaces by capturing images of the car park in real time to achieve parking space detection; while visual sensors are susceptible to lighting conditions, especially at night, when the visual parking space detection function fails. Non-visual detection methods are generally based on ultrasonic, short-range radar and LIDAR for detection. For ultrasonic and short-range radar although the parking space detection speed is fast, but the detection distance is short, there is no directional information of the parking space, and the accuracy is low; LIDAR parking space detection method is high precision and reliable, but the cost of LIDAR is high, and the detection performance decreases in rain, snow; fog and other inclement weather, which leads to a decrease in the accuracy of parking space detection or even the failure to detect a parking space. At present, these sensors cannot achieve all-weather robust parking space detection all day long.

The free-space based methods in the parking space detection algorithms are commonly used in non-visual sensors; the parking space marker point based methods are commonly used in visual sensors. Free-space based methods usually detect the position of vehicles in the surrounding car park environment based on the current ultrasonic or short-range radar, and use the spatial distance between the front and rear vehicles to detect free parking spaces, which is unable to detect vertical parking spaces and has low detection accuracy; There is also the method of dividing the car park environment into fixed-size 2D grids and calculating the probability value of each grid occupancy, with the non-occupied grids being the parkable spaces; the accuracy of this method of detection is affected by the size of the divided grids. The method based on parking space markers extracts the features of the parking space on the input image, such as corner points, parking space lines, etc., to infer the information of the parking space, and this method of detecting the parking space by extracting the features has some limitations, which can only extract the parking space with a predefined shape, and can't detect different types of parking spaces. In addition, all of the above methods perform parking space detection in the local coordinates of the self-vehicle, but cannot obtain the position information of the parking space in the global reference coordinates, which cannot be directly used in the subsequent parking applications.

SUMMARY OF THE INVENTION

It is an object of the present invention to overcome the draw backs of the above mentioned prior art, and to provide a method, device, processor, and computer-readable storage medium for global parking status detection based on 4D millimeter wave imaging radar.

In order to achieve the above objectives, the method, device, processor, and computer-readable storage medium for global parking status detection based on 4D millimeter wave imaging radar are as follows:

The method for global parking status detection based on 4D millimeter wave imaging radar, the main feature of which is that the said method comprises following steps:

(1) based on the relative transformation between the acquired front and rear frames of the 4D millimeter wave imaging radar point cloud, the estimation process of the current vehicle self-vehicle position is carried out;

(2) based on the obtained position estimation information of the self-vehicle, a submap within a predetermined range around the self-vehicle is obtained;

(3) the extraction of the point cloud for the region of interest ROI is performed in the generated submap;

(4) the extracted point cloud is sequentially processed with filtering, clustering and point cloud contour extraction to obtain the boundary points of each category;

(5) based on the acquired individual boundary points, the fitting process of the vehicle position boundary points is carried out;

(6) the current parking space boundary points detected in the submap point cloud are associated with the global parking space point cloud map for parking spaces to obtain the submap point cloud parking space and global parking space association pairs;

(7) based on the parking space association results in order to get the status of the current parking space location.

Preferably, the said step (1) specifically comprises:

(1.1) input the 4D millimeter wave imaging radar point cloud $P_i\{x_0, x_1 \ldots x_m\}$ at the current moment i and the 4D millimeter wave imaging radar point cloud $P_{i-1}\{x_0, x_1 \ldots n\}$ at the previous moment i−1; where the m is the number of radar point clouds at the current moment and the n is the number of point clouds at the previous moment;

(1.2) match the $P_i$ and $P_{i-1}$ to find the relative transformation $T_i\{R \in \mathfrak{R}^{3*3}, t \in \mathfrak{R}^{3*1}\}$ between the two frames, where the solution is specified as follows:

$$\arg\min_{T_i\{R\in\mathcal{R}^{3*3}, t\in\mathcal{R}^{3*1}\}} \sum_{s=0} \left\| x_{s_i} - (Rx_{s_{i-1}} + t) \right\|^2$$

where $x_{s_i}$ and $x_{s_{i-1}}$ are the positions of the corresponding points at the current and previous moments, R is the rotation matrix of the 3×3 self-vehicle pose, and t is the translation matrix of the 3×1 self-vehicle pose;

(1.3) the radar point cloud frames acquired at each moment are matched with the radar point cloud frames at the previous moment in the manner described above to obtain the self-vehicle pose $T\{T_0, T_1, \ldots T_i \ldots\}$ in global reference coordinates, wherein, $T_0$ is the global reference coordinate origin.

Preferably, the said step (2) is specifically:

based on the obtained self-vehicle pose $T\{T_0, T_1, \ldots T_i \ldots\}$, a first submap point cloud $M_{S_i}\{P_0, P_1, \ldots P_n\}$ within a certain range around the self-vehicle at the current moment i is obtained, wherein $P_{i \in \{0, 1, \ldots, n\}} = \{x_0, x_1 \ldots x_m \ldots\}$, the said first submap point cloud $M_{S_i}\{P_0, P_1, \ldots P_n\}$ is obtained in the following manner:

$$M_{S_i} = \sum_{s=0}^{n} \sum_{t=0}^{m} T_s x_t$$

where $T_s$ is the self-vehicle pose corresponding to the sth frame of the point cloud, and $x_t$ is the position of the tth point in the sth frame of the point cloud.

Preferably, the said step (3) is specifically:

selecting values within a certain range $(x_\sigma, y_\sigma, z_\sigma)$ in the (x, y, z) direction from the generated first submap point cloud $M_{S_i}\{P_0, P_1, \ldots P_n\}$ as the second submap point cloud $M_{S_i}'\{p_0', p_1', \ldots p_j'\}$ for subsequent processing, where j is the number of points after extracting the region of interest ROI, i.e., the said second submap point cloud $M_{S_i}'$ needs to satisfy the following conditions:

$$M_{S_i}'\{p_0', p_1', \ldots p_j'\} \text{ satisfy } p_j'\begin{pmatrix} x_j \\ y_j \\ z_j \end{pmatrix} = \begin{cases} -x_\sigma < x_j < x_\sigma \\ -y_\sigma < y_j < y_\sigma \\ -z_\sigma < z_j < z_\sigma \end{cases}$$

where $x_\sigma, y_\sigma, z_\sigma$ are the screening range thresholds in the x, y, z directions, respectively.

Preferably, the said step (4) performs submap point cloud filtering in the following manner:

(4.1.1) a point $p_j'$ in said second submap point cloud $M_{S_i}'\{p_0', p_1', \ldots p_j'\}$ is radius filtered as follows:

$$\begin{cases} \text{if } N < \alpha, & \text{discard } p_j' \\ \text{else}, & \text{retain } p_j' \end{cases}$$

where N is the number of point clouds searched with radius expansion, $\alpha$ is a set threshold for the number of point clouds searched with radius filtering, i.e., if the point $p_j'$ satisfies the judgement condition, it is considered to be an outlier and will be removed from the point cloud submap; if the judgement condition is not satisfied, then continue to keep it to get the third submap point cloud $M_{S_{ri}}'\{p_0', p_1', \ldots p_m'\}$ after radius filtering, where m<j, and the m as the number of point clouds obtained after radius filtering.

Preferably, the said submap point cloud filtering further comprises performing a statistical filtering process as follows:

(4.1.2) find the closest point cloud $P_{iK} = \{p_{i0}, p_{i1}, \ldots p_{iK}\}$ with a search proximity number K around each point $p_m'$ from the said third submap point cloud $M_{S_{ri}}'\{p_0', p_1', \ldots p_m'\}$, calculate the mean distance $d_\mu$ and standard deviation $d_\sigma$ of $p_m'$ to K nearest neighbour point cloud $P_{iK}$ as follows:

$$d_\mu = \frac{1}{K}\sum_j^K \|p_m' - p_{jK}\|$$

$$d_\sigma = \sqrt{\frac{1}{(K-1)}\sum_j^K (d_j - d_\mu)^2}, \, d_j = \|p_m' - p_{jK}\|$$

where $p_{jK}$ is the jth point cloud of the ith frame of the K nearest neighbour point clouds, $d_j$ is the distance from $p_m'$ to its nearest neighbour $p_{jK}$;

(4.1.3) $p_m'$ is considered to be noisy if said $p_m'$ satisfies the following conditions, remove it from said third submap point cloud $M_{S_{ri}}'\{p_0', p_1', \ldots p_m'\}$:

$$\begin{cases} \text{if } d_{m_i} > d_\mu + \eta \times d_\sigma, \eta = 1 & \text{discard } p_m' \\ \text{else}, & \text{retain } p_m' \end{cases}$$

where $d_{m_i}$ is the difference in distance between the distance from $p_m'$ to nearest neighbour point $p_{jK}$ and the average distance $d_\mu$ to the cloud of K nearest neighbour points $P_{iK}$, i.e:

$$d_{m_i} = \|p_m' - p_{jK}\| - d_\mu$$

(4.1.4) all the points $p_m'$ in said third submap point cloud $M_{S_{ri}}'\{p_0', p_1', \ldots p_m'\}$ are statistically filtered in the manner described above to obtain a fourth submap point cloud $M_{S_{si}}'\{p_0', p_1', \ldots p_n'\}$, where n is the number of point clouds obtained after statistical filtering.

Preferably, the said step (4) performs submap point cloud clustering in the following manner:

(4.2.1) for each point $p_n'$ in said fourth submap point cloud $M_{S_{si}}'\{p_0', p_1', \ldots p_n'\}$, find all points $P_i^k$ in its neighbourhood radius $r < d_{r_{th}}$, where $d_{r_{th}}$ is the set radius threshold; for each nearest neighbour points $p_i^k \in P_i^k$, check whether each point $p_n'$ has been looked up when search it was near the radius, and if not, add the point to category $C_i$;

(4.2.2) when each point $p_n'$ in said fourth submap point cloud $M_{S_{si}}'\{p_0', p_1', \ldots p_n'\}$ has been looked up, all point cloud categories $C_{ij}\{C_{i0}, C_{i1}, \ldots C_{ij}\}$, $C_{ij} = \{p_0^k, p_1^k, \ldots p_j^k\}$ are obtained, where j is the number of extracted categories.

Preferably, the said step (4) performs submap point cloud contour extraction process in the following manner:

(4.3.1) the said point cloud categories $C_{ij} = \{p_0^k, p_1^k, \ldots p_j^k\}$ is processed as follows:

$$p_i^k = \begin{pmatrix} x_i \\ y_i^k \\ z_i^k \end{pmatrix} \overset{2D}{\Longrightarrow} \begin{pmatrix} x_i^k \\ y_i^k \\ 0 \end{pmatrix}$$

(4.3.2) calculate the normal $$n_i^k = \begin{pmatrix} x_i \\ y_i^k \\ z_i^k \end{pmatrix}$$

for each point $p_j^k$ in each category;

(4.3.3) calculate the N nearest neighbour points $P_j^{kn}\{p_0^{kn}, p_1^{kn}, \ldots p_n^{kn}\}$ near each point $p_j^k$ and the normal vector $N_j^k\{p_0^k, p_1^k, \ldots p_n^k\}$;

(4.3.4) a point is a boundary point if the obtained normal as well as the normal vector satisfy the following conditions:

$$\theta = <n_i^k, p_n^k> \begin{cases} > \dfrac{\pi}{2}, \text{ boundary} \\ \text{else, not boundary} \end{cases}$$

(4.3.5) follow the above steps for contour extraction to get the boundary points $C_{ij}=\{b_0^k, b_1^k, \ldots b_t^k\}$ for each category, where t is the number of boundary points for each category, $b_t^k$ is the tth boundary point of the category.

Preferably, the said step (5) is specifically:

calculate the maximum values $x_{max}$, $y_{max}$ and minimum values $x_{min}$, $y_{min}$ of the x, y coordinates of the fitted parking space boundary points $S_{bj}\{(x_a, y_a), (x_b, y_b), (x_c, y_c), (x_d, y_d)\}$ from said boundary points $C_{ij}=\{b_0^k, b_1^k, \ldots b_t^k\}$ in the following manner:

$$S_{bj} \begin{cases} x_a = x_{min} \\ y_a = y_{max} \\ x_b = x_a \\ y_b = y_{min} \\ x_c = x_{max} \\ y_c = y_{min} \\ x_d = x_{max} \\ y_d = y_a \end{cases}$$

where $(x_a, y_a)$, $(x_b, y_b)$, $(x_c, y_c)$, $(x_d, y_d)$ are the coordinates of the four boundary points of the car park.

Preferably, the said step (6) specifically comprises the following steps:

(6.1) input global parking space map $M_g\{s_0, s_1, \ldots s_l\}$:

$$M_g\{s_0, s_1, \ldots s_l\}, s_l = \{(x_{la}, y_{la}), (x_{lb}, y_{lb}), (x_{lc}, y_{lc}), (x_{ld}, y_{ld}), T_{sl}\}$$

where $T_{sl}$ is the position of the parking space si in the global parking space map, $(x_{la}, y_{la})$, $(x_{lb}, y_{lb})$, $(x_{lc}, y_{lc})$, $(x_{ld}, y_{ld})$ are the coordinates of the four boundary points of the lth global parking space $s_l$ under the global coordinate system, respectively;

(6.2) obtaining all the parking spaces $M_g'\{s_0', s_1', \ldots s_l'\}$ within a distance $d_{th}$ from the vicinity of the current position $T_i$ from the said global parking space map $M_g\{s_0, s_1, \ldots s_l\}$, i.e., satisfying the:

$$\|T_{sl} - T_i\| < d_{th}$$

where $T_{sl}$ is the global position corresponding to the parking space l, $d_{th}$ is the distance threshold for detecting parking spaces;

(6.3) associating the detected parking space boundary point $S_{bj}$ with said parking space $M_g'\{s_0', s_1', \ldots s_l'\}$, iterate over each parking space $s_l'$ in $M_g'$, and calculate the distance $d_l^j$ from the position of $s_l'$ to $S_{bj}$, determine if the following conditions are met:

$$d_l^j < \sigma$$

where $\sigma$ is the association distance threshold;

(6.4) if satisfied, the submap point cloud parking spaces and global parking space association pairs $Q\{(S_{b0}, s_0'), (S_{b1}, s_1'), \ldots (S_{bi}, s_i')\}$ are directly obtained, wherein, i is the number of parking spaces successfully associated in the end, $S_{bi}$ is the detected parking space in the point cloud submap, $s_i'$ is the successfully associated parking space in the parking space global map.

Preferably, the said step (7) specifically comprises the following steps:

(7.1) for each parking space $s_l'$ in $M_g'$, if the parking space is successfully associated with $S_{bj}$, it means that the current parking space is occupied; otherwise the parking space is idle;

(7.2) finally, the positional state information of each parking space $s_l'$ in the current moment $M_g'$ is visually labelled with the successfully associated parking spaces in the global position coordinates.

The device for global parking status detection based on 4D millimeter wave imaging radar, the main feature of which is that the said device comprises:

processor, configured to execute computer-executable instructions;

memory, storing one or more computer-executable instructions, when the said computer-executable instructions are executed by the said processor, various steps for realizing the method for global parking status detection based on 4D millimeter wave imaging radar as claimed in above-described.

The processor for global parking status detection based on 4D millimeter wave imaging radar, the main feature of which is that the processor being configured to execute computer-executable instructions, when the said processor being configured to execute computer-executable instructions, various steps for realizing the method for global parking status detection based on 4D millimeter wave imaging radar as claimed in above-described.

The computer-readable storage medium, the main feature of which is that the said computer program may be executed by a processor to implement the various steps for realizing the method for global parking status detection based on 4D millimeter wave imaging radar as claimed in above-described.

With the use of this method, device, processor, and computer-readable storage medium for global parking status detection based on 4D millimeter wave imaging radar of the present invention, due to the use of 4D millimeter wave radar, its cost is lower and it has the . . . characteristic of all-weather operation, so it is more robust and easier to be mass-produced and landed in AVP and other autonomous driving application scenarios; in addition to that, this technical solution is based on 4D millimeter wave radar submap for parking space detection, which has a longer detection distance, can detect more parking spaces in the same time, and has a higher detection efficiency; at the same time, this technical solution refers to the global map of the parking space and obtains the location of the parking space in global coordinates, which is more accurate in its detection accuracy, and can be directly used by the AVP for parking without the need to additionally transform the positioning information of the self-vehicle to global coordinates, which is convenient to a certain extent.

BRIEF DESCRIPTION OF THE DRAWINGS

The sole FIGURE shows a flowchart of this method of the present invention for achieving global parking status detection based on 4D millimeter wave imaging radar.

DETAILED DESCRIPTION OF THE PREFERRED EMBODIMENT

In order to be able to understand the technical content of the present invention more clearly, is further exemplified by the following detailed description of embodiments.

Before describing in detail the embodiments according to the present invention, it should be noted that, in the following, the terms "including", "comprising" or any other variant are intended to cover non-exclusive inclusion, so that a processes, methods, goods, or equipment comprising a set of elements contains more than just those elements, and it also contains other elements that are not explicitly listed or that are inherent to such processes, methods, goods, or equipment.

Referring to the sole FIGURE, which shows that the method for global parking status detection based on 4D millimeter wave imaging radar, wherein the said method comprises following steps:

(1) based on the relative transformation between the acquired front and rear frames of the 4D millimeter wave imaging radar point cloud, the estimation process of the current vehicle self-vehicle position is carried out;

(2) based on the obtained position estimation information of the self-vehicle, a submap within a predetermined range around the self-vehicle is obtained;

(3) the extraction of the point cloud for the region of interest ROI is performed in the generated submap;

(4) the extracted point cloud is sequentially processed with filtering, clustering and point cloud contour extraction to obtain the boundary points of each category;

(5) based on the acquired individual boundary points, the fitting process of the vehicle position boundary points is carried out;

(6) the current parking space boundary points detected in the submap point cloud are associated with the global parking space point cloud map for parking spaces to obtain the submap point cloud parking space and global parking space association pairs;

(7) based on the parking space association results in order to get the status of the current parking space location.

As a preferred embodiment of the present invention, the said step (1) specifically comprises:

(1.1) input the 4D millimeter wave imaging radar point cloud $P_i\{x_0, x_1 \ldots x_m\}$ at the current moment i and the 4D millimeter wave imaging radar point cloud $P_{i-1}\{x_0, x_1 \ldots n\}$ at the previous moment i−1; where the m is the number of radar point clouds at the current moment and the n is the number of point clouds at the previous moment;

(1.2) match the $P_i$ and $P_{i-1}$ to find the relative transformation $T_i\{R \in \Re^{3*3}, t \in \Re^{3*1}\}$ between the two frames, where the solution is specified as follows:

$$\arg\min_{T_i\{R \in \mathbb{R}^{3*3}, t \in \mathbb{R}^{3*1}\}} \sum_{s=0} \left\| x_{s_i} - (Rx_{s_{i-1}} + t) \right\|^2$$

where $x_{s_i}$ and $x_{s_{i-1}}$ are the positions of the corresponding points at the current and previous moments, R is the rotation matrix of the 3×3 self-vehicle pose, t is the translation matrix of the 3×1 self-vehicle pose;

(1.3) the radar point cloud frames acquired at each moment are matched with the radar point cloud frames at the previous moment in the manner described above to obtain the self-vehicle pose $T\{T_0, T_1, \ldots T_i \ldots\}$ in global reference coordinates, wherein, $T_0$ is the global reference coordinate origin.

In practical applications, the above self-vehicle position estimation is performed in the following manner:

input current moment i 4D millimeter wave imaging radar point cloud $P_i\{x_0, x_1 \ldots x_m\}$, the m is the number of radar point clouds at the current moment, and the radar point cloud $P_{i-1}\{x_0, x_1 \ldots n\}$ at the previous moment i−1, n is the number of point clouds at the previous moment; match the $P_i$ and $P_{i-1}$, that is to find the relative transformation $T_i\{R \in \Re^{3*3}, t \in \Re^{3*1}\}$ between the two frames, to minimize the distance error between two frames of the corresponding point cloud, R is the rotation matrix of the 3*3 self-vehicle pose, and t is the translation matrix of the 3*1 self-vehicle pose, solve the following equation:

$$\arg\min_{T_i\{R \in \mathbb{R}^{3*3}, t \in \mathbb{R}^{3*1}\}} \sum_{s=0} \left\| x_{s_i} - (Rx_{s_{i-1}} + t) \right\|^2$$

where $x_{s_i}$ and $x_{s_{i-1}}$ are the positions of the corresponding points at the current and previous moments, R is the rotation of self-vehicle pose, and t is the translation of self-vehicle pose. Each momentary radar point cloud frame is matched with the previous momentary point cloud frame as above to obtain the self-vehicle pose in global reference coordinates $T\{T_0, T_1, \ldots T_i \ldots\}$, $T_0$ is the global reference coordinate origin.

As a preferred embodiment of the present invention, the said step (2) is specifically:

based on the obtained self-vehicle pose $T\{T_0, T_1, \ldots T_i \ldots\}$, a first submap point cloud $M_{S_i}\{P_0, P_1, \ldots P_n\}$ within a certain range around the self-vehicle at the current moment i is obtained, wherein $P_{i \in \{0, 1, \ldots, n\}} = \{x_0, x_1 \ldots x_m \ldots\}$, the said first submap point cloud $M_{S_i}\{P_0, P_1, \ldots P_n\}$ is obtained in the following manner:

$$M_{S_i} = \sum_{s=0}^{n} \sum_{t=0}^{m} T_s x_t$$

where $T_s$ is the self-vehicle pose corresponding to the sth frame of the point cloud, and $x_t$ is the position of the tth point in the sth frame of the point cloud.

As a preferred embodiment of the present invention, the said step (3) is specifically:

selecting values within a certain range $(x_\sigma, y_\sigma, z_\sigma)$ in the (x, y, z) direction from the generated first submap point cloud $M_{S_i}\{P_0, P_1, \ldots P_n\}$ as the second submap point cloud $M_{S_i}'\{p_0', p_1', \ldots p_j'\}$ for subsequent processing, where j is the number of points after extracting the region of interest ROI, i.e., the said second submap point cloud $M_{S_i}'$ needs to satisfy the following conditions:

$$Ms_i'\{p_0', p_1', \ldots p_j'\} \text{ satisfy } p_j'\begin{pmatrix}x_j \\ y_j \\ z_j\end{pmatrix} = \begin{cases}-x_\sigma < x_j < x_\sigma \\ -y_\sigma < y_j < y_\sigma \\ -z_\sigma < z_j < z_\sigma\end{cases}$$

where $x_\sigma, y_\sigma, z_\sigma$ are the screening range thresholds in the x, y, z directions, respectively.

As a preferred embodiment of the present invention, the said step (4) performs submap point cloud filtering in the following manner:

(4.1.1) a point $p_j'$ in said second submap point cloud $M_{S_i}'\{p_0', p_1', \ldots p_j'\}$ is radius filtered as follows:

$$\begin{cases} \text{if } N < \alpha, & \text{discard } p_j' \\ \text{else,} & \text{retain } p_j' \end{cases}$$

where N is the number of point clouds searched with radius expansion, $\alpha$ is a set threshold for the number of point clouds searched with radius filtering, i.e., if the point $p_j'$ satisfies the judgement condition, it is considered to be an outlier and will be removed from the point cloud submap; if the judgement condition is not satisfied, then continue to keep it to get the third submap point cloud $M_{S_{ri}}'\{p_0', p_1', \ldots p_m'\}$ after radius filtering, where m<j, and the m as the number of point clouds obtained after radius filtering.

As a preferred embodiment of the present invention, the said submap point cloud filtering further comprises performing a statistical filtering process as follows:

(4.1.2) find the closest point cloud $P_{iK}=\{p_{i0}, p_{i1}, \ldots p_{iK}\}$ with a search proximity number K around each point $p_m'$ from the said third submap point cloud $M_{S_{ri}}'\{p_0', p_1', \ldots p_m'\}$, calculate the mean distance $d_\mu$ and standard deviation $d_\sigma$ of $p_m'$ to K nearest neighbour point cloud $P_{iK}$ as follows:

$$d_\mu = \frac{1}{K}\sum_j^K \|p_m' - p_{jK}\|$$

$$d_\sigma = \frac{1}{(K-1)}\sqrt{\sum_j^K(d_j - d_\mu)^2}, d_j = \|p_m' - p_{jK}\|$$

where $p_{jK}$ is the jth point cloud of the ith frame of the K nearest neighbour point clouds, $d_j$ is the distance from $p_m'$ to its nearest neighbour $p_{jK}$;

(4.1.3) $p_m'$ is considered to be noisy if said $p_m'$ satisfies the following conditions, remove it from said third submap point cloud $M_{S_{ri}}'\{p_0', p_1', \ldots p_m'\}$:

$$\begin{cases} \text{if } d_{m_i} > d_\mu + \eta \times d_\sigma, & \eta = 1 \text{ discard } p_m' \\ \text{else,} & \text{retain } p_m' \end{cases}$$

where $d_{m_i}$ is the difference in distance between the distance from $p_m'$ to nearest neighbour point $p_{jK}$ and the average distance $d_\mu$ to the cloud of K nearest neighbour points $P_{iK}$, i.e:

$$d_{m_i} = \|p_m' - p_{jK}\| - d_\mu$$

(4.1.4) all the points $p_m'$ in said third submap point cloud $M_{S_{ri}}'\{p_0', p_1', \ldots p_m'\}$ are statistically filtered in the manner described above to obtain a fourth submap point cloud $M_{S_{si}}'\{p_0', p_1', \ldots p_n'\}$, where n is the number of point clouds obtained after statistical filtering.

In practical applications, this submap point cloud filtering of the present technical solution is performed as follows:

some outlying independent and noisy points are removed from the point cloud $M_{S_i}'\{p_0', p_1', \ldots p_j'\}$ after extracting ROI, providing a good input for the next point cloud clustering, specifically, radius filtering and statistical filtering are done on the submap point cloud; radius filtering is the search for N point clouds around a point $p_j'$ in a submap point cloud of radius R, a point $p_j'$ is considered an outlier and removed from the point cloud submap if the following conditions are met.

$$\begin{cases} \text{if } N < \alpha, & \text{discard } p_j' \\ \text{else,} & \text{retain } p_j' \end{cases}$$

$\alpha$ is a set threshold for the number of point clouds searched with radius filtering. Do radius filtering for each point in the submap of the point cloud to get the radius filtered submap point cloud $M_{S_{ri}}'\{p_0', p_1', \ldots p_m'\}$, m<j, m is the number of point clouds after radius filtering.

As a preferred embodiment of the present invention, the said step (4) performs submap point cloud clustering in the following manner:

clustering of the submap point clouds $M_{S_{si}}'\{p_0', p_1', \ldots p_n'\}$ after the filtering process, i.e., based on the distribution relationship of the point clouds in space, divide the point cloud into several categories $C_{ij}\{C_{i0}, C_{i1} \ldots C_{ij}\}$, j is the number of current submap point clouds $M_{S_{si}}'$ extracted into the category. The process of specific clustering is as follows:

(4.2.1) for each point $p_n'$ in said fourth submap point cloud $M_{S_{si}}'\{p_0', p_1', \ldots p_n'\}$, find all points $P_i^k$ in its neighbourhood radius $r<d_{r_{th}}$, where $d_{r_{th}}$ is the set radius threshold; for each nearest neighbour points $p_i^k \in P_i^k$, check whether each point $p_n'$ has been looked up when search it was near the radius, and if not, add the point to category $C_i$;

(4.2.2) when each point $p_n'$ in said fourth submap point cloud $M_{S_{si}}'\{p_0', p_1', \ldots p_n'\}$ has been looked up, all point cloud categories $C_{ij}\{C_{i0}, C_{i1} \ldots C_{ij}\}$, $C_{ij}=\{p_0^k, p_1^k, \ldots p_j^k\}$ are obtained, where j is the number of extracted categories.

As a preferred embodiment of the present invention, the said step (4) performs submap point cloud contour extraction process in the following manner:

(4.3.1) 2D the 3D point cloud, i.e., to perform the following processes on the described point cloud categories $C_{ij}=\{p_0^k, p_1^k, \ldots p_j^k\}$:

$$p_i^k = \begin{pmatrix} x_i^k \\ y_i^k \\ z_i^k \end{pmatrix} \overset{2D}{\Longrightarrow} \begin{pmatrix} x_i^k \\ y_i^k \\ 0 \end{pmatrix}$$

(4.3.2) calculate the normal $$n_i^k = \begin{pmatrix} x_i^k \\ y_i^k \\ z_i^k \end{pmatrix}$$

for each point $p_j^k$ in each category, normal calculations are the most basic treatment in spatial geometry;

(4.3.3) calculate the N nearest neighbour points $P_j^{kn}\{p_0^{kn}, p_1^{kn}, \ldots p_n^{kn}\}$ near each point $p_j^k$ and the normal vector $N_j^k\{p_0^k, p_1^k, \ldots p_n^k\}$, normal vector computation as the most basic treatment of space geometry;

(4.3.4) a point is a boundary point if the obtained normal as well as the normal vector satisfy the following conditions:

$$\theta = <n_i^k, p_n^k> \begin{cases} > \frac{\pi}{2}, \text{ boundary} \\ \text{else, not boundary} \end{cases}$$

(4.3.5) follow the above steps for contour extraction to get the boundary points $C_{ij}=\{b_0^k, b_1^k, \ldots b_t^k\}$ for each category, where t is the number of boundary points for each category, $b_t^k$ is the tth boundary point of the category.

As a preferred embodiment of the present invention, the said step (5) is specifically:

calculate the maximum values $x_{max}$, $y_{max}$ and minimum values $x_{min}$, $y_{min}$ of the x, y coordinates of the fitted parking space boundary points $S_{bj}\{(x_a, y_a), (x_b, y_b), (x_c, y_c), (x_d, y_d)\}$ from said boundary points $C_{ij}=\{b_0^k, b_1^k, \ldots b_t^k\}$ in the following manner:

$$S_{bj} \begin{cases} x_a = x_{min} \\ y_a = y_{max} \\ x_b = x_a \\ y_b = y_{min} \\ x_c = x_{max} \\ y_c = y_{min} \\ x_d = x_{max} \\ y_d = y_a \end{cases}$$

where $(x_a, y_a)$, $(x_b, y_b)$, $(x_c, y_c)$, $(x_d, y_d)$ are the coordinates of the four boundary points of the car park.

As a preferred embodiment of the present invention, the said step (6) specifically comprises the following steps:

(6.1) input global parking space map $M_g\{s_0, s_1, \ldots s_l\}$:

$M_g\{s_0, s_1, \ldots s_l\}, s_l = \{(x_{la}, y_{la}), (x_{lb}, y_{lb}), (x_{lc}, y_{lc}), (x_{ld}, y_{ld}), T_{sl}\}$ where $T_{sl}$ is the position of the parking space si in the global parking space map, $(x_{la}, y_{la})$, $(x_{lb}, y_{lb})$, $(x_{lc}, y_{lc})$, $(x_{ld}, y_{ld})$ are the coordinates of the four boundary points of the lth global parking space $s_l$ under the global coordinate system, respectively;

(6.2) obtaining all the parking spaces $M_g'\{s_0', s_1', \ldots s_l'\}$ within a distance $d_{th}$ from the vicinity of the current position $T_i$ from the said global parking space map $M_g\{s_0, s_1, \ldots S_l\}$, i.e., satisfying the:

$$\|T_{sl} - T_i\| < d_{th}$$

where $T_{sl}$ is the global position corresponding to the parking space l, $d_{th}$ is the distance threshold for detecting parking spaces;

(6.3) associating the detected parking space boundary point $S_{bj}$ with said parking space $M_g'\{s_0', s_1', \ldots s_l'\}$, iterate over each parking space $s_l'$ in $M_g'$, and calculate the distance $d_l^j$ from the position of $s_l'$ to $S_{bj}$, determine if the following conditions are met:

$d_l^j < \sigma$ where $\sigma$ is the association distance threshold;

(6.4) if satisfied, the submap point cloud parking spaces and global parking space association pairs $Q\{(S_{b0}, s_0'), (S_{b1}, s_1'), \ldots (S_{bi}, s_i')\}$ are directly obtained, i is the number of parking spaces successfully associated in the end, $S_{bi}$ is the detected parking space in the point cloud submap, $s_i'$ is the successfully associated parking space in the parking space global map.

As a preferred embodiment of the present invention, the said step (7) specifically comprises the following steps:

(7.1) for each parking space $s_l'$ in $M_g'$, if the parking space is successfully associated with $S_{bj}$, it means that the current parking space is occupied; otherwise the parking space is idle;

(7.2) finally, the positional state information of each parking space $s_l'$ in the current moment $M_g'$ is visually labelled with the successfully associated parking spaces in the global position coordinates.

The device for global parking status detection based on 4D millimeter wave imaging radar, wherein, the said device comprises:

processor, configured to execute computer-executable instructions;

memory, storing one or more computer-executable instructions, when the said computer-executable instructions are executed by the said processor, various steps for realizing the method for global parking status detection based on 4D millimeter wave imaging radar as claimed in above-described.

The processor for global parking status detection based on 4D millimeter wave imaging radar, wherein, the processor being configured to execute computer-executable instructions, when the said processor being configured to execute computer-executable instructions, various steps for realizing the method for global parking status detection based on 4D millimeter wave imaging radar as claimed in above-described.

The computer-readable storage medium, wherein, the said computer program may be executed by a processor to implement the various steps for realizing the method for global parking status detection based on 4D millimeter wave imaging radar as claimed in above-described.

Any process or method description depicted in the flowchart or otherwise described herein may be understood to represent a module, fragment, or portion of code comprising one or more executable instructions for implementing the steps of a particular logical function or process, and that the scope of the preferred embodiments of the present invention includes additional implementations, which may be, in no particular order as shown or discussed, including performing functions in a substantially simultaneous manner or in reverse order, according to the functions involved, should be understood by those skilled in the art to which embodiments of the present invention belong.

It should be understood that various parts of the invention may be implemented with hardware, software, firmware, or combinations thereof. In the above embodiments, a plurality of steps or methods may be implemented with software or firmware stored in memory and executed by a suitable instruction execution device.

One of ordinary skill in the art can appreciate that all or some of the steps carried out to realize the method of the above embodiments can be accomplished by instructing the associated hardware by means of a program, which can be stored in a computer-readable storage medium that, when executed, comprises one of the steps of the method embodiments or a combination thereof.

The storage media mentioned above may be read-only memories, disks or CD, etc.

In the description of this specification, reference to the terms "an embodiment", "some embodiments", "example", "specific example", or "embodiment" means that a specific feature, structure, material, or characteristic described in conjunction with the embodiment or example is included in at least one embodiment or example of the present invention. In this specification, schematic representations of the above terms do not necessarily refer to the same embodiments or examples. Moreover, specific features, structures, materials, or characteristics described may be combined in any one or more embodiments or examples in a suitable manner.

Although embodiments of the present invention have been shown and described above, it is to be understood that the above embodiments are exemplary and are not to be construed as a limitation of the present invention, and that one of ordinary skill in the art may make changes, modifications, substitutions, and variations of the above embodiments within the scope of the present invention.

With the use of this method, device, processor, and computer-readable storage medium for global parking status detection based on 4D millimeter wave imaging radar of the present invention, due to the use of 4D millimeter wave radar, its cost is lower and it has the characteristic of all-weather operation, so it is more robust and easier to be mass-produced and landed in AVP and other autonomous driving application scenarios; in addition to that, this technical solution is based on 4D millimeter wave radar submap for parking space detection, which has a longer detection distance, can detect more parking spaces in the same time, and has a higher detection efficiency; at the same time, this technical solution refers to the global map of the parking space and obtains the location of the parking space in global coordinates, which is more accurate in its detection accuracy, and can be directly used by the AVP for parking without the need to additionally transform the positioning information of the self-vehicle to global coordinates, which is convenient to a certain extent.

In this specification, the present invention has been described with the reference to its specific embodiments. However, it is obvious still may be made without departing from the spirit and scope of the present invention, various modifications and transformation. Accordingly, the specification and drawings should be considered as illustrative rather than restrictive.

We claim:

1. A method for global parking status detection based on 4D millimeter wave imaging radar, the method comprising following steps:
   (1) based on a relative transformation between the acquired front and rear frames of a 4D millimeter wave imaging radar point cloud, an estimation process of the current vehicle self-vehicle position is carried out;
   (2) based on the obtained position estimation information of the self-vehicle, a submap within a predetermined range around the self-vehicle is obtained;
   (3) extraction of the radar point cloud for a region of interest ROI is performed in the obtained submap;
   (4) the extracted point cloud for the region of interest ROI is sequentially processed with filtering, clustering and point cloud contour extraction to obtain the boundary points of each category comprising filtering, clustering and point cloud contour extraction;
   (5) based on the obtained boundary points of each category, the fitting process of the self-vehicle position boundary points is carried out;
   (6) the current parking space boundary points detected in the submap point cloud are associated with a global parking space point cloud map for parking spaces to obtain the submap point cloud parking space and global parking space association pairs; and
   (7) a status of the current parking space location is obtained based on the submap point cloud parking space association result.

2. The method for global parking status detection based on 4D millimeter wave imaging radar according to claim 1, wherein the said step (1) specifically comprises:
   (1.1) input the 4D millimeter wave imaging radar point cloud $P_i\{x_0, x_1 \ldots x_m\}$ at the current moment i and the 4D millimeter wave imaging radar point cloud $P_{i-1}\{x_0, x_1 \ldots n\}$ at the previous moment i−1; where the m is the number of radar point clouds at the current moment and the n is the number of point clouds at the previous moment;
   (1.2) match the $P_i$ and $P_{i-1}$ to find the relative transformation $T_i\{R \in \Re^{3*3}, t \in \Re^{3*1}\}$ between the two frames, where the solution is specified as follows:

$$\arg\min_{T_i\{R \in \Re^{3*3}, t \in \Re^{3*1}\}} \sum_{s=0} \left\| x_{s_i} - (Rx_{s_{i-1}} + t) \right\|^2$$

where $x_{s_i}$ and $x_{s_{i-1}}$ are the positions of the corresponding points at the current and previous moments, R is the rotation matrix of the 3×3 self-vehicle pose, and t is the translation matrix of the 3×1 self-vehicle pose;
   (1.3) the radar point cloud frames acquired at each moment are matched with the radar point cloud frames at the previous moment in the manner described above to obtain the self-vehicle pose $T\{T_0, T_1, \ldots T_i \ldots\}$ in global reference coordinates, wherein, $T_0$ is the global reference coordinate origin.

3. The method for global parking status detection based on 4D millimeter wave imaging radar according to claim 2, wherein the said step (2) is specifically:
   based on the obtained self-vehicle pose $T\{T_0, T_1, \ldots T_i \ldots\}$, a first submap point cloud $M_{S_i}\{P_0, P_1, \ldots P_n\}$ within a certain range around the self-vehicle at the current moment i is obtained, wherein $P_{i \in \{0, 1 \ldots n\}} = \{x_0, x_1 \ldots x_m \ldots\}$, the said first submap point cloud $M_{S_i}\{P_0, P_1, \ldots P_n\}$ is obtained in the following manner:

$$M_{S_i} = \sum_{s=0}^{n} \sum_{t=0}^{m} T_s x_t$$

where $T_s$ is the self-vehicle pose corresponding to the sth frame of the point cloud, and $x_t$ is the position of the tth point in the sth frame of the point cloud.

4. The method for global parking status detection based on 4D millimeter wave imaging radar according to claim 3, wherein the said step (3) is specifically:
   selecting values within a certain range $(x_\sigma, y_\sigma, z_\sigma)$ in the (x, y, z) direction from the generated first submap point cloud $M_{S_i}\{P_0, P_1, \ldots P_n\}$ as the second submap point cloud $M_{S_i}'\{p_0', p_1', \ldots p_j'\}$ for subsequent processing, where j is the number of points after extracting the region of interest ROI, i.e., the said second submap point cloud $M_{S_i}'$ needs to satisfy the following conditions:

$$M'_{S_i}\{p'_0, p'_1, \ldots p'_j\} \text{ satisfy } p'_j \begin{pmatrix} x_j \\ y_j \\ z_j \end{pmatrix} = \begin{cases} -x_\sigma < x_j < x_\sigma \\ -y_\sigma < y_j < y_\sigma \\ -z_\sigma < z_j < z_\sigma \end{cases}$$

where $x_\sigma$, $y_\sigma$, $z_\sigma$ are the screening range thresholds in the x, y, z directions, respectively.

5. The method for global parking status detection based on 4D millimeter wave imaging radar according to claim 4, wherein the said step (4) performs submap point cloud filtering in the following manner:

(4.1.1) a point $p'_j$ in said second submap point cloud $M_{S_i}'\{p_0', p_1', \ldots p_j'\}$ is radius filtered as follows:

$$\begin{cases} \text{if } N < \alpha, & \text{discard } p'_j \\ \text{else,} & \text{retain } p'_j \end{cases}$$

where N is the number of point clouds searched with radius expansion, $\alpha$ is a set threshold for the number of point clouds searched with radius filtering, i.e., if the point $p'_j$ satisfies the judgement condition, it is considered to be an outlier and will be removed from the point cloud submap; if the judgement condition is not satisfied, then continue to keep it to get the third submap point cloud $M_{S_i}'\{p_0', p_1', \ldots p_m'\}$ after radius filtering, where m<j, and the m as the number of point clouds obtained after radius filtering.

6. The method for global parking status detection based on 4D millimeter wave imaging radar according to claim 5, wherein the said submap point cloud filtering further comprises performing a statistical filtering process as follows:

(4.1.2) find the closest point cloud $P_{iK}=\{p_{i0}, p_{i1}, \ldots p_{iK}\}$ with a search proximity number K around each point $p_m'$ from the said third submap point cloud $M_{S_i}\{p_0', p_1', \ldots p_m'\}$, calculate the mean distance $d_\mu$ and standard deviation $d_\sigma$ of $p_m'$ to K nearest neighbour point cloud $P_{iK}$ as follows:

$$d_\mu = \frac{1}{K} \sum_j^K \|p_m' - p_{jK}\|$$

$$d_\sigma = \frac{1}{(K-1)} \sqrt{\sum_j^K (d_j - d_\mu)^2}, \quad d_j = \|p_m' - p_{jK}\|$$

where $p_{jK}$ is the jth point cloud of the ith frame of the K nearest neighbour point clouds, $d_j$ is the distance from $p_m'$ to its nearest neighbour $p_{jK}$;

(4.1.3) $p_m'$ is considered to be noisy if said $p_m'$ satisfies the following conditions, remove it from said third submap point cloud $M_{S_{ri}}'\{p_0', p_1', \ldots p_m'\}$:

$$\begin{cases} \text{if } d_{m_i} > d_\mu + \eta \times d_\sigma, \eta = 1 & \text{discard } p'_m \\ \text{else,} & \text{retain } p'_m \end{cases}$$

where $d_{m_i}$ is the difference in distance between the distance from $p_m'$ to nearest neighbour point $p_{jK}$ and the average distance $d_\mu$ to the cloud of K nearest neighbour points $P_{iK}$, i.e:

$$d_{m_i} = \|p_m' - p_{jK}\| - d_\mu$$

(4.1.4) all the points $p_m'$ in said third submap point cloud $M_{S_{ri}}'\{p_0', p_1', \ldots p_m'\}$ are statistically filtered in the manner described above to obtain a fourth submap point cloud $M_{S_{si}}'\{p_0', p_1', \ldots p_n'\}$, where n is the number of point clouds obtained after statistical filtering.

7. The method for global parking status detection based on 4D millimeter wave imaging radar according to claim 6, wherein the said step (4) performs submap point cloud clustering in the following manner:

(4.2.1) for each point $p_n'$ in said fourth submap point cloud $M_{S_{si}}'\{p_0', p_1', \ldots p_n'\}$, find all points $P_i^K$ in its neighbourhood radius $r < d_{r_{th}}$, where $d_{r_{th}}$ is the set radius threshold; for each nearest neighbour points $p_i^k \in P_i^k$, check whether each point $p_n'$ has been looked up when search it was near the radius, and if not, add the point to category $C_i$;

(4.2.2) when each point $p_n'$ in said fourth submap point cloud $M_{S_{si}}'\{p_0', p_1', \ldots p_n'\}$ has been looked up, all point cloud categories $C_{ij}\{C_{i0}, C_{i1} \ldots C_{ij}\}$, $C_{ij}=\{p_0^k, p_1^k, \ldots p_j^k\}$ are obtained, where j is the number of extracted categories.

8. The method for global parking status detection based on 4D millimeter wave imaging radar according to claim 7, wherein the said step (4) performs submap point cloud contour extraction process in the following manner:

(4.3.1) the said point cloud categories $C_{ij}=\{p_0^k, p_1^k, \ldots p_j^k\}$ is processed as follows:

$$p_i^k = \begin{pmatrix} x_i^k \\ y_i^k \\ z_i^k \end{pmatrix} \stackrel{2D}{\Longrightarrow} \begin{pmatrix} x_i^k \\ y_i^k \\ 0 \end{pmatrix}$$

(4.3.2) calculate the normal $$n_i^k = \begin{pmatrix} x_i^k \\ y_i^k \\ z_i^k \end{pmatrix}$$

for each point $p_j^k$ in each category; (4.3.2) calculate the normal:

(4.3.3) calculate the N nearest neighbour points $p_j^{kn}\{p_0^{kn}, p_1^{kn}, \ldots p_n^{kn}\}$ near each point $p_j^k$ and the normal vector $N_j^k\{p_0^k, p_1^k, \ldots p_n^k\}$;

(4.3.4) a point is a boundary point if the obtained normal as well as the normal vector satisfy the following conditions:

$$\theta = <n_i^k, p_n^k> \begin{cases} > \frac{\pi}{2}, & \text{boundary} \\ \text{else,} & \text{not boundary} \end{cases}$$

(4.3.5) follow the above steps for contour extraction to get the boundary points $C_{ij}=\{b_0^k, b_1^k, \ldots b_t^k\}$ for each category, where t is the number of boundary points for each category, $b_t^k$ is the tth boundary point of the category.

9. The method for global parking status detection based on 4D millimeter wave imaging radar according to claim 8, wherein the said step (5) is specifically:

calculate the maximum values $x_{max}$, $y_{max}$ and minimum values $x_{min}$, $y_{min}$ of the x, y coordinates of the fitted parking space boundary points $S_{bj}\{(x_a, y_a), (x_b, y_b), (x_c, y_c), (x_d, y_d)\}$ from said boundary points $C_{ij}=\{b_0^k, b_1^k, \ldots b_r^k\}$ in the following manner:

$$S_{bj} \begin{cases} x_a = x_{min} \\ y_a = y_{max} \\ x_b = x_a \\ y_b = y_{min} \\ x_c = x_{max} \\ y_c = y_{min} \\ x_d = x_{max} \\ y_d = y_a \end{cases}$$

where $(x_a, y_a)$, $(x_b, y_b)$, $(x_c, y_c)$, $(x_d, y_d)$ are the coordinates of the four boundary points of the car park.

10. The method for global parking status detection based on 4D millimeter wave imaging radar according to claim 9, wherein the said step (6) specifically comprises the following steps:

(6.1) input global parking space map $M_g\{s_0, s_1, \ldots s_l\}$:

$$M_g\{s_0, s_1, \ldots s_l\}, s_l=\{(x_{la}, y_{la}),(x_{lb}, y_{lb}),(x_{lc}, y_{lc}),(x_{ld}, y_{ld}), T_{sl}\}$$

where $T_{sl}$ is the position of the parking space si in the global parking space map, $(x_{la}, y_{la})$, $(x_{lb}, y_{lb})$, $(x_{lc}, y_{lc})$, $(x_{ld}, y_{ld})$ are the coordinates of the four boundary points of the lth global parking space $s_l$ under the global coordinate system, respectively;

(6.2) obtaining all the parking spaces $M'_g\{s'_0, s'_1, \ldots s'_l\}$ within a distance $d_{th}$ from the vicinity of the current position $T_i$ from the said global parking space map $M_g\{s_0, s_1, \ldots s_l\}$, i.e., satisfying the:

$$\|T_{sl} - T_i\| < d_{th}$$

where $T_{sl}$ is the global position corresponding to the parking space l, $d_{th}$ is the distance threshold for detecting parking spaces;

(6.3) associating the detected parking space boundary point $S_{bj}$ with said parking space $M'_g\{s'_0, s'_1, \ldots s'_l\}$, iterate over each parking space $s'_l$ in $M'_g$, and calculate the distance $d_l^j$ from the position of $s'_l$ to $S_{bj}$, determine if the following conditions are met:

$$d_l^j < \sigma$$

where $\sigma$ is the association distance threshold;

(6.4) if satisfied, the submap point cloud parking spaces and global parking space association pairs $Q\{(S_{b0}, s'_0), (S_{b1}, s'_1), \ldots (S_{bi}, s'_i)\}$ are directly obtained, i is the number of parking spaces successfully associated in the end, $S_{bi}$ is the detected parking space in the point cloud submap, $s'_i$ is the successfully associated parking space in the parking space global map.

11. The method for global parking status detection based on 4D millimeter wave imaging radar according to claim 10, wherein the said step (7) specifically comprises the following steps:

(7.1) for each parking space $s'_l$ in $M'_g$, if the parking space is successfully associated with $S_{bj}$, it means that the current parking space is occupied; otherwise the parking space is idle;

(7.2) finally, the positional state information of each parking space $s'_l$ in the current moment $M'_g$ is visually labelled with the successfully associated parking spaces in the global position coordinates.

12. A device for global parking status detection based on 4D millimeter wave imaging radar, wherein the device comprises:

processor, configured to execute computer-executable instructions; and memory, storing one or more computer-executable instructions, when the said computer-executable instructions are executed by the said processor, various steps for realizing the method for global parking status detection based on 4D millimeter wave imaging radar as claimed in claim 1.

13. A processor for global parking status detection based on 4D millimeter wave imaging radar, wherein the processor being configured to execute computer-executable instructions, when the said processor being configured to execute computer-executable instructions, various steps for realizing the method for global parking status detection based on 4D millimeter wave imaging radar as claimed in claim 1.

14. A non-transitory computer-readable storage medium, having a computer program stored on it, the said computer program may be executed by a processor to implement the various steps for realizing the method for global parking status detection based on 4D millimeter wave imaging radar as claimed in claim 1.

\* \* \* \* \*